United States Patent Office 3,793,450
Patented Feb. 19, 1974

3,793,450
STABLE, NON-PYROGENETIC, INTRAVENOUSLY ADMINISTRABLE AQUEOUS FAT EMULSIONS CONTAINING AMINO ACIDS
Joachim Schnell, Melsungen, Germany, assignor to B. Braun Melsungen Aktiengesellschaft, Melsungen, Germany
No Drawing. Continuation-in-part of application Ser. No. 284,998, Aug. 22, 1972, which is a continuation of application Ser. No. 847,396, Aug. 4, 1969, both now abandoned. This application Dec. 1, 1972, Ser. No. 311,102
Claims priority, application Germany, Aug. 16, 1968, P 17 92 294.0; July 7, 1969, P 19 34 317.0
Int. Cl. A61k *27/00*
U.S. Cl. 424—195     7 Claims

ABSTRACT OF THE DISCLOSURE

Stable infusion compositions for intravenous administration in which essential amino acids are present in the form of free bases in a fat emulsion, such as of soya bean oil. The emulsified compositions also contain soya phosphatide or egg yolk phosphatide as stabilizers. Methods for making such compositions.

---

This application is a continuation-in-part of copending application Ser. No. 284,998, filed Aug. 22, 1972, which latter application is, in turn, a continuation of application Ser. No. 847,396, filed Aug. 4, 1969, both are now abandoned.

The present application relates to stable infusion compositions for intravenous administration comprising essential amino acids in a fat emulsion.

In medical practice, parenteral intravenous feeding is effected in all cases in which the patient is prevented from food intake per os because of a grave disease or after an operation. The decision whether parenteral feeding has to be administered depends on the patient's general condition. In case the general condition is bad and an oral food intake cannot be expected to be possible for a longer period, it is necessary to supply all essential nutritive substances intravenously. Water, vitamins, electrolytes, trace elements, carbohydrates, amino acids, and fats are essential for a complete parenteral feeding and, in some cases, alcohol may be required as source for calories. For some years, infusion solutions containing the said substances in a form compatible with the human organism have been on the market.

As basis for a complete parenteral feeding three types of infusion solutions are known, viz carbohydrate solutions, amino acid solutions, and fat emulsions. To these solutions there are added vitamins, electrolytes and trace elements which constitute, as far as their amount is concerned, only a small part of the nutrition as compared to the three main food carriers.

The total demand of calories and nitrogen must be satisfied by parenteral feeding. The single nutrients have a quite different nutritive value. Thus, for example, 1 g. of carbohydrate corresponds to about 4 kcal., 1 g. of alcohol corresponds to about 7 kcal. and 1 g. of fat corresponds to about 9 kcal. Amino acids, which supply 4 kcal. per 1 gram, should, however, be present as elements for the synthesis of proteins. This, however, is only possible if the amount of calories supplied by fats and carbohydrates covers the energy requirements of the organism. In case the amount of calories is insufficient, amino acids are also utilized as source for calories, this effect being, however, undesirable and leading to a negative nitrogen balance.

Thus, in clinical practice, complete parenteral feeding is effected by administering three separated infusion solutions. Because of the better compatibility with the wall of the vein, hyper-osmolar amino acid solutions are frequently administered simultaneously with a fat emulsion through the same needle or the same catheter. This kind of administration, however, necessitates the use of special tube systems and, simultaneously, the control of two bottles of infusion solutions by the hospital staff.

It would, therefore, be an important simplification if it would be possible to combine fats and amino acids in one single emulsion. Another advantage of such a combined infusion solution would be that the supply of water to the organism would be reduced. Manufacturers of infusion solutions usually recommend administering the amino acid solutions and the fat emulsions in a volume ratio of 2 to 1, i.e., for example, 1000 ml. of a 5% commercial amino acid solution and 500 ml. of a commercial 10% fat emulsion are administered. If a combined emulsion, containing, per 1000 ml., 50 g. of amino acids and 50 g. of fat could be successfully prepared, the amount of liquid supplied would be reduced by 33%. This reduction would mean an important relief for the patient since the danger of overhydration would be reduced. Moreover, the margin for the intravenous administration of, for example, carbohydrates or of solutions which regulate the electrolyte metabolism, would be increased.

However, fat emulsions or, generally, oil-in-water emulsions, physically and chemically, constitute a metastable system which is converted by external disturbances, for example, by the effects of temperature or the addition of electrolytes or colloids, into an energetically stable state. This process is manifested in the separation of the phases, designated as "creaming." Since amino acids also may be regarded as electrolytes because of their dipolar-ionic character, it could be expected that the stability of fat emulsions containing amino acids would be considerably reduced.

Now it has been found that when certain conditions are observed, stable, non-pyrogenic, aqueous fat emulsions containing amino acids, which emulsions are administered intravenously, can be obtained by dissolving in water the essential (and, if desired or required, additionally, non-essential) amino acids which are necessary for the parenteral feeding of humans, in their D, L- or L-forms and in amounts and concentrations favorable to the human organism, and by emulsifying the fat suitable for infusions, in the required amount, in the said amino acid solution by means of an emulsifier admissible, compatible and suitable for these purposes. Furthermore, the aqueous phase may also contain glycerin and/or other polyalcohols, such as sorbite or xylite.

The stable aqueous fat emulsions containing amino acids may also be obtained by preparing the aqueous amino acid solution and the fat emulsion separately and by subsequently mixing the two components.

In contrast to microorganisms and other lower organisms, the animal and especially the human organism is not able itself to synthesize all amino acids necessary for the synthesis of proteins. Eight so-called essential amino acids are known which must be present in food if serious disturbances in protein metabolism are to be avoided. It is important that amino acid solutions contain, for parenteral feeding, all essential amino acids such as lysine, methionine, phenylalanine, leucine, isoleucine, valine, tryptophane, and threonine in sufficient quantities. They may advantageously additionally contain other, so-called nonessential, amino acids, for example glycine, alanine, proline, histidine, or diamino valeric acid and serine. The quantitative relation of the single amino acids should be selected in a manner that a well-balanced or slightly positive nitrogen balance is possible in the organism when an amount as small as possible of amino acid nitrogen is supplied. The elimination of nitrogen-containing products of metabolism should not exceed the supply of nitrogen in the form of amino acids. However, opinions as to which recipe for the preparation of amino acids is most favorable for the organism differ widely. Apparently, certain mechanisms of regulation in the human organism allow an economical exploitation of different mixtures of protein elements.

For the preparation of aqueous amino acid solutions, the essential (and, if desired or required, additionally, non-essential) amino acids which are necessary for parenteral feeding, such as diaminovaleric acid, lysine, and histidine are used in the form of their hydrochlorides or preferably as free bases. The salt form of the basic amino acids is converted into the free bases, for example by means of a suitable ion-exchanger. The content of amino acids in the finished fat emulsion containing amino acids may be about 1 to 10% by weight.

Now it has been found that it is possible, though it could not be expected, to combine the essential amino acids in sufficient amounts with the fat emulsion and, furthermore, to add the non-essential amino acids glycine, alanine, proline, and histidine, or diaminovaleric acid and serine, as well as to vary the total content of amino acids in the fat emulsion within wide limits. Thus, it has been possible to prepare stable fat emulsions which have no pyrogenic effect and can be administered intravenously, the content of amino acids varying from about 1% to about 10% and the content of fat varying from about 1% to about 15%. The particle size is always below 1 micron, the danger of fat embolism being excluded thereby. These emulsions which had been prepared, for example, by using fractionated soya phosphatides as emulsifiers in a high-pressure homogenizer, could be sterilized by heat and behaved as usual commercial pure fat emulsions when stored at 60° C.

Furthermore, it has been found that the addition of glycerin or carbohydrates, for example, saccharine alcohol, sorbite and xylite, in quantities in the range from 1 to 15%, preferably from 5 to 10%, has a favorable effect on the preparation and the stability of the fat emulsions containing amino acids. The addition of these carbohydrates is advantageous because it has a favorable effect on the fat metabolism. Moreover, it increases the caloric value of the emulsion.

The preparation of a finished aqueous fat emulsion containing amino acids from an aqueous amino acid solution and fat emulsion which are initially prepared separately may be carried out as follows:

A fat emulsion of higher concentration is prepared by emulsifying a fat suitable for infusions, for example, soya bean oil, with an emulsifier admissible, compatible and suitable for the intended use of the emulsion, for example, a soya phosphatide consisting essentially of soya bean lecithin or an egg yolk phosphatide consisting essentially of egg lecithin. This emulsion is then mixed with an aqueous amino acid solution having a suitable concentration, this solution containing the essential amino acids and, if desired or required, additionally, the non-essential amino acids necessary for parenteral feeding in quantities suitable for the human organism. The mixture is filled into bottles and sterilized by heat in these bottles in an autoclave. The content of fat in the fat emulsion containing amino acids may be about 1 to 15% by weight.

Another process which offers certain advantages as regards storability of the finished emulsions comprises initially preparing a fat emulsion and an aqueous amino acid solution in suitable concentrations, sterilizing the two components separately, and combining them, after cooling, under sterile conditions. After thorough mixing, the finished fat emulsion containing amino acids may be filled, under aseptic conditions, into previousy sterilized bottles. Another sterilization is not necessary. This process offers certain advantages because the finished emulsion does not have to be subjected again to elevated temperatures which are necessary for sterilization. The storability of the finished emulsion is considerably increased thereby.

The methods of parenteral feeding are largely improved by the use of the new fat emulsions containing amino acids, because (1) the amount of liquid administered can be reduced to a large extent as compared to the methods hitherto used wherein amino acids and fats were administered separately, the margin for the administration of other solutions, for example diluted carbohydrate solutions or therapeutics being thus increased;
(2) parenteral feeding in clinical practice is simplified since, instead of three, only two different solutions have to be administered;
(3) the simultaneous administration of hypertonic amino acid solutions together with fat emulsions, recommended hitherto by the manufacturers and used to prevent irritations of the wall of a vein, can now be made obligatory by using a fat emulsion containing amino acids; and
(4) the danger of creaming of the fat emulsion in the supplying needle, when simultaneous infusion of the fat emulsion and the amino acid solution is carried out improperly, no longer exists because of the now-available compatible combination of these two nutritive substances.

The synthesis and the preparation of the fat emulsion containing amino acids is illustrated in the following examples, but they are not intended to limit the invention thereto. Other possible modifications result from the indications given in the description and in the patent claims.

EXAMPLE 1

The following substances were dissolved in 5 liters of aqua bidestillata, while using a stirrer:

| | G. |
|---|---|
| D,L-isoleucine | 16.9 |
| L-leucine | 26.9 |
| D,L-threonine | 16.9 |
| D,L-valine | 22.9 |
| D,L-tryptophane | 10.0 |
| D,L-phenylalanine | 22.9 |
| D,L-methionine | 27.5 |
| L-lysine | 6.0 |
| L-histidine | 11.0 |
| L-diaminovaleric acid | 8.5 |
| Glycine | 320.0 |
| Glycerin | 500.0 |

To this solution there were added 75 g. of fractionated soya phosphatides, consisting essentially of soya bean lecithin, obtained by extraction from soya meat with ethyl alcohol, and the solution was then mixed. Then, 500 g. of purified soya bean oil were added and aqua bidestillata was added until a volume of 10 liters was attained. The mixture was then pre-emulsified by means of a high speed stirrer (for example an "Ultraturrax") and subsequently homogenized in a high-pressure homogenizer at a pressure of 400 kg./cm.$^2$ The finished emulsion was filled, under nitrogen, into glass bottles of the first hydrolytic grade, and the closed bottles were sterilized by heat. The particles of an emulsion thus prepared were smaller than 1 micron. The emulsion was sterile and pyrogen-free.

EXAMPLE 2

Example 1 was repeated using, as the stabilizer, an egg yolk phosphatide in place of the soya phosphatide. The egg yolk material is suitably obtained by the method disclosed by Hanahan et al. in J. Biol. Chemistry 192, 623 (1951), incorporated herein by reference. By this method, the phosphatide mixture, mainly consisting of egg yolk lecithin, is obtained by dehydrating fresh egg yolk with acetone; extracting the dehydrated material with ethanol; purifying by extracting with petroleum ether, precipitating and washing with acetone, and passing an ethanol solution over an aluminum oxide column. The material consists essentially of egg lecithin.

EXAMPLE 3

The following substances were dissolved in 5 liters of aqua bidestillata:

| | G. |
|---|---|
| L-leucine | 24 |
| L-isoleucine | 14 |
| L-valine | 16 |
| L-threonine | 10 |
| L-phenylalanine | 22 |
| L-methionine | 24 |
| L-tryptophane | 5 |
| L-lysine | 16 |
| L-diaminovaleric acid | 8.5 |
| L-histidine | 11 |
| L-alanine | 130 |
| Glycine | 125 |
| Sorbite | 500 |

As described in Example 1, 75 g. of soya phosphatides and 500 g. of soya bean oil were added to the finished solution and the final volume was filled up to 10 liters. The preparation was carried out as described in Example 1, and a sterile, pyrogen-free emulsion was obtained, the particle size of which was below 1 micron.

EXAMPLE 4

The following substances were dissolved in 5 liters of aqua bidestillata, while using a stirrer:

| | G. |
|---|---|
| D, L- or L-isoleucine | 14.0 |
| D, L- or L-leucine | 22.0 |
| D, L- or L-lysine | 16.0 |
| D, L- or L-methionine | 22.0 |
| D, L- or L-phenylalanine | 22.0 |
| D, L- or L-threonine | 10.0 |
| D, L- or L-tryptophane | 5.0 |
| D, L- or L-valine | 16.0 |
| D, L- or L-diaminovaleric acid | 98.0 |
| D, L- or L-proline | 27.0 |
| D, L- or L-alanine | 128.0 |
| Glycine | 130.0 |

The finished solution was sterilized in a suitable flask containing 5 liters.

Preparation of the fat emulsion 500 g. of purified soya bean oil were added to 75 g. of fractional soya phosphatides obtained by extraction from soya meal with ethyl alcohol, and aqua bidestillata was added until a volume of 5 liters was attained. The mixture was then pre-emulsified by means of a high speed stirrer and subsequently homogenized in a high-pressure homogenizer at a pressure of 400 kg./cm.$^2$. The finished emulsion was heat sterilized under nitrogen in suitable flasks. The fat emulsion and the amino acid solution were combined, after sterilization and cooling, under sterile conditions and filled into sterile evacuated bottles of the first hydrolytic grade. The particle size of an emulsion prepared in this manner was about 1 micron. The emulsion was sterile and pyrogen-free. The preparation may also be carried out by mixing the aqueous amino acid solution and the fat emulsion with one another, filling the mixture into bottles, and sterilizing by heat in an autoclave.

EXAMPLE 5

The following substances were dissolved in 5 liters of aqua bidestillata, while using a stirrer:

| | G. |
|---|---|
| D, L- or L-isoleucine | 20.5 |
| D, L- or L-leucine | 23.0 |
| D, L- or L-lysine | 22.5 |
| D, L- or L-methionine | 17.5 |
| D, L- or L-phenylalanine | 12.5 |
| D, L- or L-threonine | 14.0 |
| D, L- or L-tryptophane | 7.0 |
| D, L- or L-valine | 28.0 |
| D, L- or L-diaminovaleric acid | 75.0 |
| D, L- or L-alanine | 145.0 |
| Glycine | 135.0 |
| Sorbite | 500.0 |

The finished solution was sterilized as described in Example 1.

Preparation of the fat emulsion 750 g. of purified soya bean oil were added to 100 g. of fractional soya phosphatides obtained by extraction of soya meal with ethanol, and aqua bidestillata was added until a volume of 5 liters was attained. The mixture was pre-emulsified by means of a high speed stirrer and the emulsion was further treated as described in Example 1. The fat emulsion and the amino acid solution were combined, after sterilization and cooling, under sterile conditions and filled into sterile evacuated bottles of the first hydrolytic grade. The particle size of an emulsion prepared in this manner was about 1 micron. The emulsion was sterile and pyrogen-free.

The two components can also be mixed with one another before sterilization. The mixture is then filled into bottles and sterilized by heat in an autoclave.

What is claimed is:

1. A stable, non-pyrogenic, intravenously administrable infusion composition consisting essentially of a sterile aqueous emulsion of a fat suitable for infusion, said emulsion containing essential nutritive amino acids in the form of their free bases and being stabilized with about 15 percent, by weight of said fat, of a member selected from the group consisting of fractionated soya phosphatide obtained by ethanol extraction of soya meal and egg yolk phosphatide obtained by ethanol extraction of dehydrated egg yolk, the fat content of said composition being from about 1 to 15 percent by weight and the amino acid content being from about 1 to 10 percent by weight.

2. A composition as in claim 1 wherein said fat is soya bean oil.

3. A composition as in claim 1 additionally containing a non-essential nutritive amino acid.

4. A composition as in claim 1 additionally containing a nutritive polyalcohol suitable for infusion.

5. A composition as in claim 4 wherein said polyalcohol is sorbite.

6. A composition as in claim 1 stabilized with soya phosphatide.

7. A composition as in claim 1 stabilized with egg yolk phosphatide.

References Cited

UNITED STATES PATENTS

| | | | |
|---|---|---|---|
| 2,977,283 | 3/1961 | Meyer et al. | 424—312 |
| 3,067,098 | 12/1962 | Pool | 424—180 |
| 3,080,234 | 3/1963 | Jarowski | 424—319 |
| 3,152,955 | 10/1964 | Gow et al. | 424—319 |
| 3,169,094 | 2/1965 | Wretlind | 424—312 |

STANLEY J. FRIEDMAN, Primary Examiner

U.S. Cl. X.R.

424—180, 313, 319, 343